United States Patent
Zagorski et al.

(10) Patent No.: US 9,376,095 B2
(45) Date of Patent: Jun. 28, 2016

(54) METHODS AND APPARATUS FOR DETERMINING TIRE/ROAD COEFFICIENT OF FRICTION

(75) Inventors: Chad T. Zagorski, Clarkston, MI (US); Aamrapali Chatterjee, Okemos, MI (US); Nikolai K. Moshchuk, Gross Pointe, MI (US); Shih-Ken Chen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1300 days.

(21) Appl. No.: 12/841,769

(22) Filed: Jul. 22, 2010

(65) Prior Publication Data

US 2012/0022747 A1 Jan. 26, 2012

(51) Int. Cl.
| | |
|---|---|
| *B60R 22/00* | (2006.01) |
| *E05F 15/00* | (2015.01) |
| *B60T 7/12* | (2006.01) |
| *G05D 1/00* | (2006.01) |
| *G06F 7/00* | (2006.01) |
| *G06F 17/00* | (2006.01) |
| *B60T 8/172* | (2006.01) |

(52) U.S. Cl.
CPC ............. *B60T 8/172* (2013.01); *B60T 2210/12* (2013.01)

(58) Field of Classification Search
None
See application file for complete search history.

(56) References Cited

U.S. PATENT DOCUMENTS

| | | | | |
|---|---|---|---|---|
| 5,357,798 | A | * | 10/1994 | Weinzerl ............. B60T 8/17551 701/1 |
| 5,563,792 | A | * | 10/1996 | Ander ..................... B60T 8/172 180/197 |
| 5,699,040 | A | | 12/1997 | Matsuda |
| 6,084,508 | A | | 7/2000 | Mai et al. |
| 6,125,319 | A | * | 9/2000 | Hac et al. ......................... 701/80 |
| 6,312,065 | B1 | | 11/2001 | Freitag et al. |

(Continued)

FOREIGN PATENT DOCUMENTS

| | | |
|---|---|---|
| DE | 19743383 A1 | 4/1998 |
| DE | 102007039176 A1 | 2/2009 |
| DE | 102010037639 A1 | 4/2011 |

OTHER PUBLICATIONS

Zagorski, C.T., et al. "Methods and Apparatus for a Vehicle Emergency Control System," U.S. Appl. No. 12/790,455, filed May 28, 2010.

(Continued)

*Primary Examiner* — Ariel Yu
(74) *Attorney, Agent, or Firm* — Ingrassia Fisher & Lorenz, P.C.

(57) ABSTRACT

A vehicle control method includes iteratively modifying a level of braking of the vehicle until it is determined that the vehicle has substantially lost traction with respect to the road surface, then determining the coefficient of friction between the road surface and the tire based on the level of braking at the time the vehicle substantially lost fraction. In one embodiment, previous ABS or other vehicle control events are used as a basis for estimating an initial level of braking to be applied during the friction measurement procedure. Such a deterministic maneuver can also function as a collision warning to the driver of the vehicle.

7 Claims, 4 Drawing Sheets

(56) References Cited

U.S. PATENT DOCUMENTS

| | | | |
|---|---|---|---|
| 7,375,620 B2 | | 5/2008 | Balbale et al. |
| 7,983,828 B2 | * | 7/2011 | Ezoe et al. .................. 701/78 |
| 8,180,547 B2 | | 5/2012 | Prasad et al. |
| 2001/0029419 A1 | * | 10/2001 | Matsumoto ............ B60T 8/172 701/80 |
| 2004/0122578 A1 | * | 6/2004 | Isaji et al. .................. 701/70 |
| 2007/0191997 A1 | | 8/2007 | Isaji et al. |
| 2009/0018740 A1 | | 1/2009 | Noda et al. |
| 2009/0192687 A1 | | 7/2009 | Zagorski |
| 2009/0276134 A1 | * | 11/2009 | Sherman ..................... 701/82 |
| 2009/0322500 A1 | | 12/2009 | Chatterjee et al. |
| 2010/0006363 A1 | | 1/2010 | Zagorski |
| 2011/0082623 A1 | | 4/2011 | Lu et al. |
| 2011/0295464 A1 | | 12/2011 | Zagorski et al. |

OTHER PUBLICATIONS

Velenis, E., et al. "Optimal Velocity Profile Generation for given Acceleration Limits; The Half-Car Model Case," IEEE International Symposium on Industrial Electronics, Jun. 20-23, 2005, pp. 361-366.

Eidehall, A. et al., "Toward Autonomous Collision Avoidance by Steering," IEEE International Conference on Intelligent Transportation Systems, Mar. 2007, pp. 84-94, vol. 8, No. 1.

German Office Action, dated Mar. 15, 2012, for German Patent Application No. 10 2011 107 105.2.

USPTO Final Office Action for U.S. Appl. No. 12/790,455 dated Apr. 12, 2013.

USPTO, Office Action in U.S. Appl. No. 12/790,455, mailed Oct. 8, 2014.

* cited by examiner

METHODS AND APPARATUS FOR DETERMINING TIRE/ROAD COEFFICIENT OF FRICTION

TECHNICAL FIELD

Embodiments of the subject matter described herein relate generally to vehicle emergency control systems and, more particularly, to emergency braking and steering systems used in connection with collision prevention.

BACKGROUND

Modern vehicles often incorporate some form of stability control system to ensure that the actual path of the vehicle corresponds to the path intended by the driver, particularly during hard braking and/or steering operations. Such vehicles might also include collision avoidance systems that sense whether an object is within the vehicle's path and then take corrective action accordingly. This corrective action might take the form of alerting the driver or autonomously applying braking and/or steering to reduce the relative velocity between the vehicle and the obstacle.

Prior art systems typically assume that the vehicle can maintain a specified lateral (sideways) and longitudinal (front/back) acceleration, usually within a friction ellipse of about 0.8 g's maximum lateral and 0.9 g's maximum longitudinal for a dry high coefficient road surface. These acceleration values are then used by the system to determine how much braking and steering can be applied while still maintaining suitable fraction between the vehicle and the road.

Under certain conditions, such as rain, snow, etc., the actual maximum lateral and longitudinal acceleration capabilities of the vehicle may be reduced. Accordingly, it is desirable to provide improved emergency braking and steering systems in which tire and road friction characteristics are measured and taken into account. Other desirable features and characteristics of the present invention will become apparent from the subsequent detailed description and the appended claims, taken in conjunction with the accompanying drawings and the foregoing technical field and background.

BRIEF SUMMARY OF THE INVENTION

A vehicle control method in accordance with one embodiment generally includes iteratively modifying a level of braking of the vehicle until it is determined that the vehicle has substantially lost traction with respect to the road surface, then determining the coefficient of friction between the road surface and the tire based on the level of braking at the time the vehicle substantially lost traction. In one embodiment, previous ABS or other vehicle control events are used as a basis for estimating an initial level of braking to be applied during the friction measurement procedure.

A vehicle control system in accordance with one embodiment generally includes: a collision preparation system controller configured to receive friction data indicative of the coefficient of friction between a vehicle and a road surface; a brake controller coupled to the collision preparation system controller; and a steering controller coupled to the collision preparation system controller. The collision preparation system controller is configured to: store a set of predetermined criteria relating to the motion of the vehicle; store a set of vehicle actions associated with the set of predetermined criteria; iteratively provide friction-sensing braking commands to the brake controller until a slip threshold is determined; determine the friction data based on the slip threshold; modify the set of predetermined criteria based on the friction data; and provide a braking command to the brake controller and/or a steering command to the steering controller based on the modified set of predetermined criteria. Such a deterministic braking maneuver can also function as a collision warning to the driver of the vehicle.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. Furthermore, there is no intention to be bound by any express or implied theory presented in the preceding technical field, background, brief summary or the following detailed description.

For the purposes of conciseness, many conventional techniques and principles related to vehicular braking systems, steering systems, control systems, and the like are not described in detail herein.

Techniques and technologies may be described herein in terms of functional and/or logical block components and various processing steps. It should be appreciated that such block components may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

Figure 1:
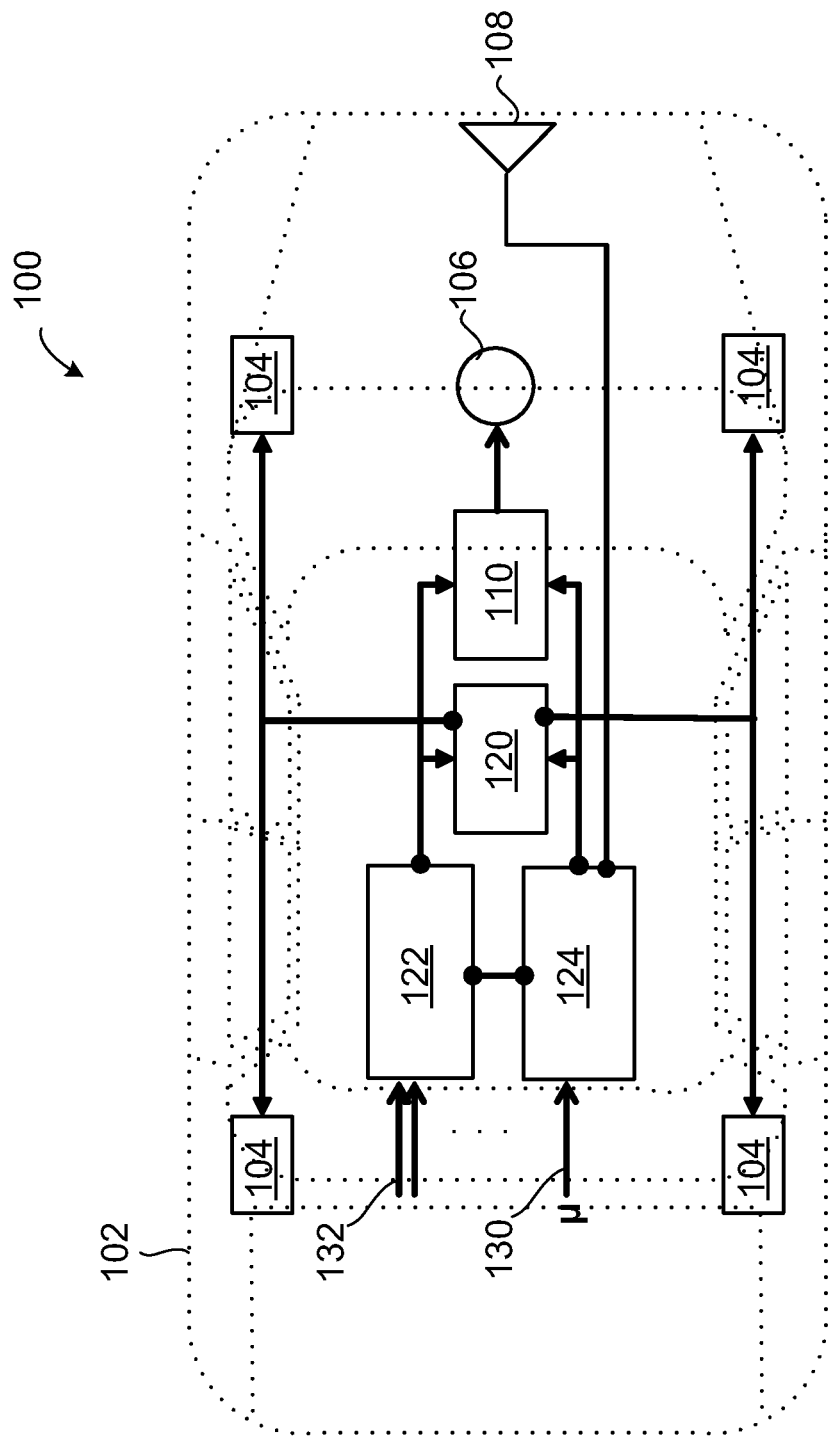
FIG. 1 is a conceptual block diagram of a vehicle and system in accordance with one embodiment of the invention.

FIG. 1 is a conceptual top-view block diagram of an exemplary collision avoidance system 100 for a motor vehicle (or simply "vehicle") 102. Note that, in the interest of clarity, various components of vehicle 102, such as tires, wheels, brakes, steering mechanisms, and the like, are not depicted in FIG. 1. Similarly, those skilled in the art will appreciate that, while vehicle 102 is shown in FIG. 1 as a standard automobile, the present invention may be employed in the context of trucks or any other vehicle in which emergency steering/braking may be desirable.

As shown, system 100 includes a set of brake actuators 104 coupled to a brake controller 120, and a steering actuator 106 coupled to a steering controller 110. Both brake controller 120 and steering controller 110 are coupled to a stability controller 122 and a collision preparation system (CPS) adjustment controller 124, which itself receives information (e.g., information regarding potential collision) from a CPS system 108.

In general, stability controller 122 receives various inputs 132 from sensors and other components of motor vehicle 102 relating to, for example, the vehicle speed, acceleration, yaw rate, wheel angle, wheel speed, and other attributes of motor vehicle 102. Stability controller 122 then processes these inputs and determines whether certain actions should be taken to maintain the stability (of vehicle 102. In one embodiment, for example, stability controller 122 is implemented as described in U.S. Pat. No. 5,941,919.

CPS sensing system 108 is configured to determine the state of vehicle 102 with respect to objects in its environment—for example, objects in the path of vehicle 102 that might pose a risk of collision—and provide the appropriate signal and/or information to CPS adjustment controller 124. In one embodiment, CPS sensing system 108 is implemented in the manner disclosed in one or more of U.S. Pat. No. 7,375,620, and U.S. patent application Ser. No. 12/168,973, and thus includes one or more short range radar components, long range radar components, or any other collection of components configured to sense the presence of objects in the vicinity of vehicle 102.

CPS adjustment controller 124 receives a signal or other information from CPS sensing system 108, processes that information, and determines whether steering and/or braking maneuvers should be performed to prevent or reduce the likelihood of collision with an object in the path of vehicle 102. That is, while stability controller 122 is generally concerned with maintaining the stability of vehicle 102, CPS adjustment controller is directed at preventing or mitigating the collision of vehicle 102 in the event certain criteria are met.

CPS adjustment controller 124, stability controller 122, brake controller 120, and steering controller together cooperate to adjust the braking and/or steering of motor vehicle 102 in response to information received from CPS sensing system 108. That is, in general, in the event that the motion of vehicle 102 fits within certain predetermined criteria (modified, if necessary, by information related to road conditions), CPS adjustment controller 124 sends a braking signal to brake controller 120 system and/or a steering signal to steering controller 110, thereby causing brake actuator 104 and/or steering actuator 106 to effect the appropriate collision-avoidance maneuvers.

In accordance with the present invention, CPS adjustment controller 124 also receives an input 130 indicative of a frictional attribute (e.g., static or dynamic coefficient of friction) of the road surface with respect to the tires of vehicle 102 (in general, referred to as "friction data" 130), and uses that information to determine whether and to what extent collision-avoidance maneuvers should be performed. The term "friction data" is thus used without loss of generality to mean any form of signal, whether digital or analog, that represents road/tire friction directly, or can be used to derive and/or estimate road/tire friction. For example, friction data 130 may comprise an analog current or voltage that has been correlated (e.g., via a look-up table or empirically-derived equation) to a frictional attribute. Alternatively, friction data 130 may comprise a digital signal representing an integer or real number communicated in accordance with any convenient digital communication protocol.

Figure 2:
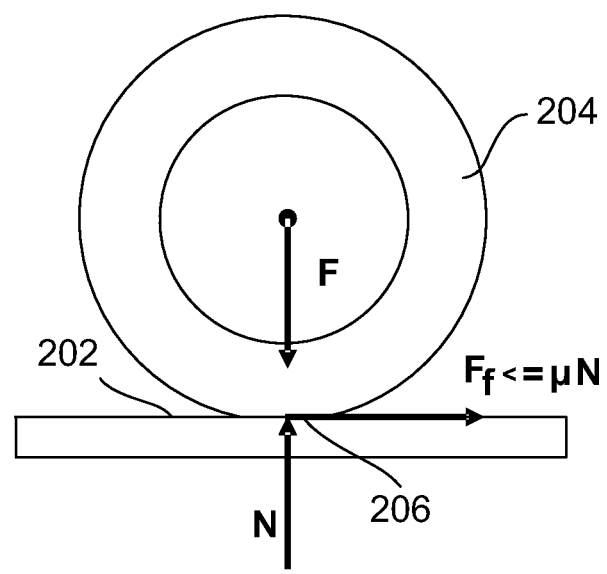
FIG. 2 is a conceptual side view depicting the frictional force between a tire and a surface.

Regardless of the way friction data 130 is acquired or derived, this data preferably includes at least one coefficient of friction value. Referring now to FIG. 2 in conjunction with FIG. 1, due in part to the weight of vehicle 102, a force F is imparted to tire 204, producing an opposite and equal normal force N on tire 204 within a contact region (or "contact patch") 206 of surface 202. The illustrated frictional force $F_f$ is then the force resisting the relative longitudinal motion of tire 204 at contact region 206 with respect to surface 202. While the vector force $F_f$ is shown as pointing left-to-right, those skilled in the art will appreciate that, depending upon kinematic conditions, $F_f$ may be oriented in any arbitrary direction orthogonal to normal force N.

This force $F_f$ depends on the normal force N and the tire-road interface friction characteristics. The maximum value of $F_f$ is expressed as the product of the normal force N and a dimensionless parameter $\mu$, referred to as the coefficient of friction. This coefficient of friction $\mu$ may be a measure of either the static coefficient of friction or the dynamic coefficient of friction. The static coefficient of friction is associated with the friction between two objects that are not moving with respect to each other at their point of contact (i.e., region 206). Conversely, the dynamic coefficient of friction is associated with the friction between two objects undergoing relative motion at their point of contact.

In the context of the present invention, the term coefficient of friction generally refers to the effective static coefficient of friction between tire 204 and surface 202, and may thus take into account any of the various subcategories of frictional effects, including fluid friction, dry friction, skin friction, and the like. That is, the coefficient of friction may take into account the presence of water, oil, debris, and/or other material that might be present between tire 204 and surface 202.

With continued reference to FIG. 2, if it is assumed that tire 204 is rotating counter-clockwise, and thus moving from right to left, then tire 204 will continue to rotate in a well-behaved fashion, maintaining traction, as long as the longitudinal force applied by tire 204 in region 206 does not exceed the magnitude of frictional force $F_f$. If, however, the longitudinal force (e.g., due to excessive forward acceleration or sudden braking) exceeds the magnitude of $F_f$, then tire 204 will lose fraction and slip with respect to surface 202, i.e., rather than simply rolling in the counter-clockwise direction.

In order to maintain a vehicle within its frictional force limits as described in conjunction with FIG. 2, it is often convenient to visualize the "friction ellipse" or "friction circle" governing the motion of the vehicle. In any practical application, the shape of the friction circle depends on a myriad of factors, including tire characteristics (tire material, tread, temperature, etc.), road surface conditions, vehicle weight, vehicle dynamic characteristics, and the like. The friction circle effectively constricts as the coefficient of friction is reduced. In general, a collision avoidance process performed by CPS adjustment controller 124 of FIG. 1 thus includes storing a set of criteria and a set of corresponding actions (e.g., evasive braking and steering maneuvers), modifying the criteria based on the friction data, then performing the appropriate actions when predetermined criteria (or "entrance criteria") are met. Further information regarding friction circles and related criteria may be found, for example, in co-pending U.S. application Ser. No. 12/790,455, which is hereby incorporated by reference.

In accordance with one aspect of the present invention, CPS adjustment controller autonomously instructs brake controller 120 of FIG. 1 to perform a short brake pulse (while the vehicle is moving), then examines the vehicle's resultant acceleration to determine the tire/road coefficient of friction. This friction data is then used to tailor the response of the vehicle safety system. Further, if the vehicle has recently experienced an anti-lock-brake or stability control event, the level of resultant acceleration during the event can be determined and used as a baseline estimate of the acceleration the current tire/road interface can withstand.

Referring to the flowcharts shown in FIGS. 3 and 4, an exemplary method in accordance with one embodiment of the invention will now be described. The method may be implemented by any combination of hardware and software, and may be localized or distributed within, for example, any of the functional blocks shown in FIG. 1.

Initially, during normal operation of the vehicle (i.e., while the car is in motion), it is assumed that an object-of-interest is detected within the path of the vehicle (step 302). The object may be detected, for example, by CPS sensing system 108 of FIG. 1. The object-of-interest may be a human, an animal, another vehicle, or any other object that might lie within the vehicle's path.

Next, in step 304, the system determines whether collision of the vehicle with the object-of-interest will occur within some suitable predetermined amount of time ($t_1$). In one embodiment, for example, $t_1$ is about 1.5-2.5 seconds, though the invention is not so limited.

If it is determined that collision will likely occur without driver action within the predetermined amount of time, the system queries whether a ABS or other vehicle control event (e.g., stability control event) has taken place within a predetermined amount of time ($t_2$). In general, a vehicle control event is any event where traction between the vehicle and the road was all or partially lost, and a history of such vehicle control events (with respective time stamps) is preferably stored in stability controller 122 or some other component of the system shown in FIG. 1. The system then interrogates the stored data to determine whether such an event has taken place within the predetermined amount of time.

The timeframe used for $t_2$ will generally balance a number of factors. For example, it is desirable that $t_2$ be sufficiently large that it captures recent data that might be useful in estimating (as a first approximation) the coefficient of friction of the current road surface. At the same time, however, it is desirable that $t_2$ not be so large that it captures events that have occurred on a different road surface. For example, if the vehicle is currently traveling on pavement, any previous data regarding an ABS event on gravel road would likely not be helpful. Thus, in one embodiment, $t_2$ ranges from about 3 to 10 seconds, although the invention is not so limited.

During a vehicle control event of the type queried in step 306, the acceleration and other kinematic attributes of the vehicle at that time will generally be known by one or more of the modules shown in FIG. 1. That information is then used, if available, as a first approximation of coefficient of friction. That is, if a vehicle control event was found in step 306, processing continues with step 308, wherein a coefficient of friction measurement procedure (discussed below) is performed starting with the deceleration level information from the vehicle control event. If no event was found, the coefficient of friction measurement procedure is employed starting with default deceleration level without the benefit of a first approximation (step 310).

Figure 4:
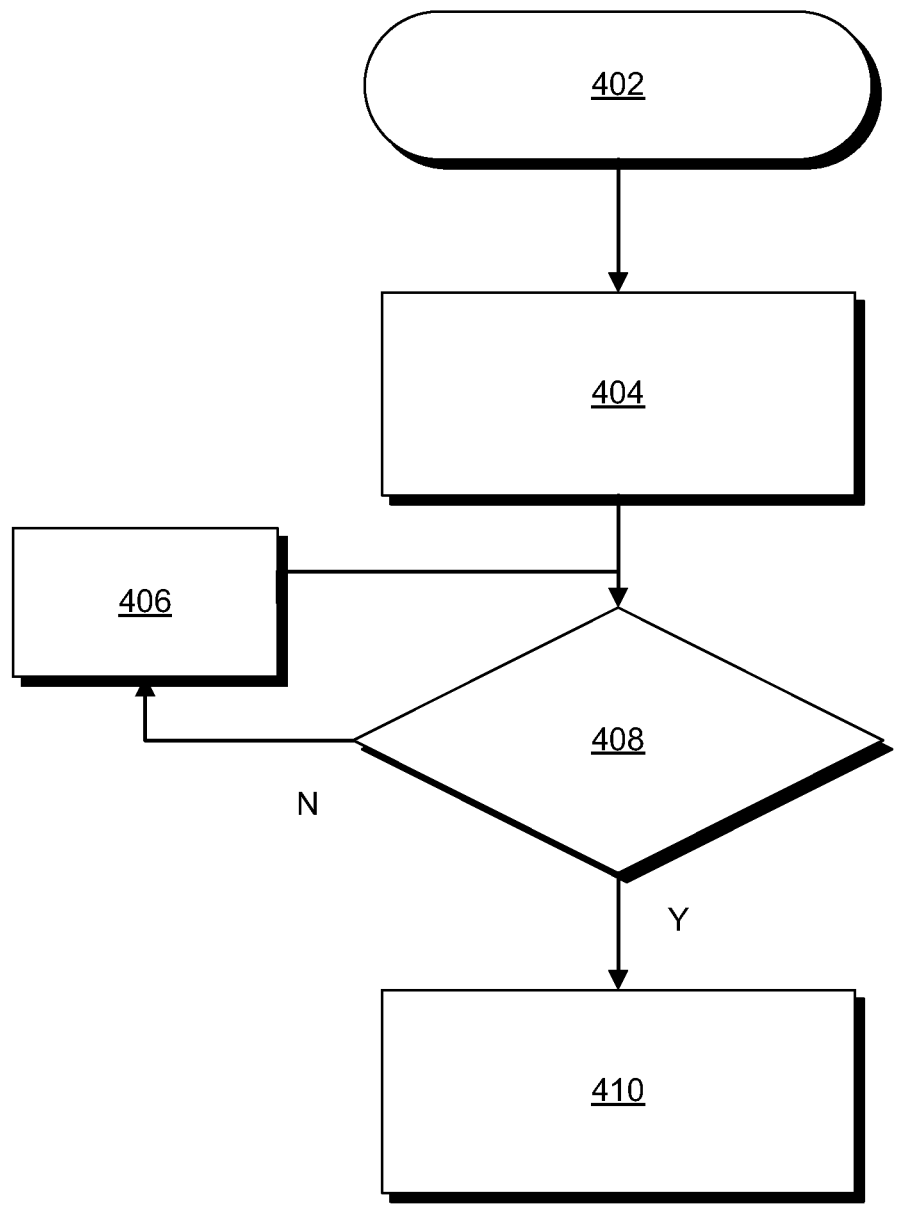
FIG. 4 is a block diagram depicting a coefficient of friction measurement procedure in accordance with one embodiment of the present invention.

An exemplary method of determining the coefficient of friction is shown in FIG. 4. As the process begins (402), the system engages automatic braking at some predetermined level. If no previous vehicle control event was sensed in step 306, then the system may begin at some preselected high braking level—for example, a 0.6 g. That is, brake module 120 of FIG. 1 instructs actuators 104 to provide a level of braking that results in the vehicle experiencing 0.6 g of negative acceleration.

If, however, a first approximation was determined in step 306, that deceleration level (the "event acceleration") is then used as the initial level of braking. For example, if a recent ABS event occurred in such a way that the vehicle could not maintain more than 0.3 g of acceleration without losing traction, the initial level of braking is set to about 0.3 g.

Next, in steps 406 and 408, the system iteratively adjusts (reduces or increases) the automatic braking level until the slip threshold is reached—i.e., the point at which the vehicle loses traction. Thus, for example, if 0.3 g of braking is applied, and the vehicle still maintains traction, the braking is increased iteratively until the vehicle loses traction. Conversely, if 0.9 g of braking is applied in step 404, and the vehicle immediately loses traction, then the braking level is reduced iteratively until the vehicle maintains traction. In either case, once the slip threshold is determined, the automated braking is removed. Steps 404-408 thus take place in a relatively short timeframe (e.g., about 1-1.5 seconds), resulting in a short brake pulse.

Once the slip threshold is determined, the deceleration of the vehicle at or near that moment is then used to determine the coefficient of friction, as described in detail above (i.e., using mass of the car, the magnitude of the slipping force, etc.). Alternatively, only the acceleration at that time may be determined, and decisions are made based on the acceleration value, which acts as a proxy for the friction value. That is, the phrase "friction data," as used herein, also includes data regarding acceleration that can be correlated to the coefficient of friction. In one embodiment, the system calculates the resultant of the current lateral acceleration and the last longitudinal acceleration prior to slipping. This resultant is then used as the basis of determining the coefficient of friction.

Figure 3:
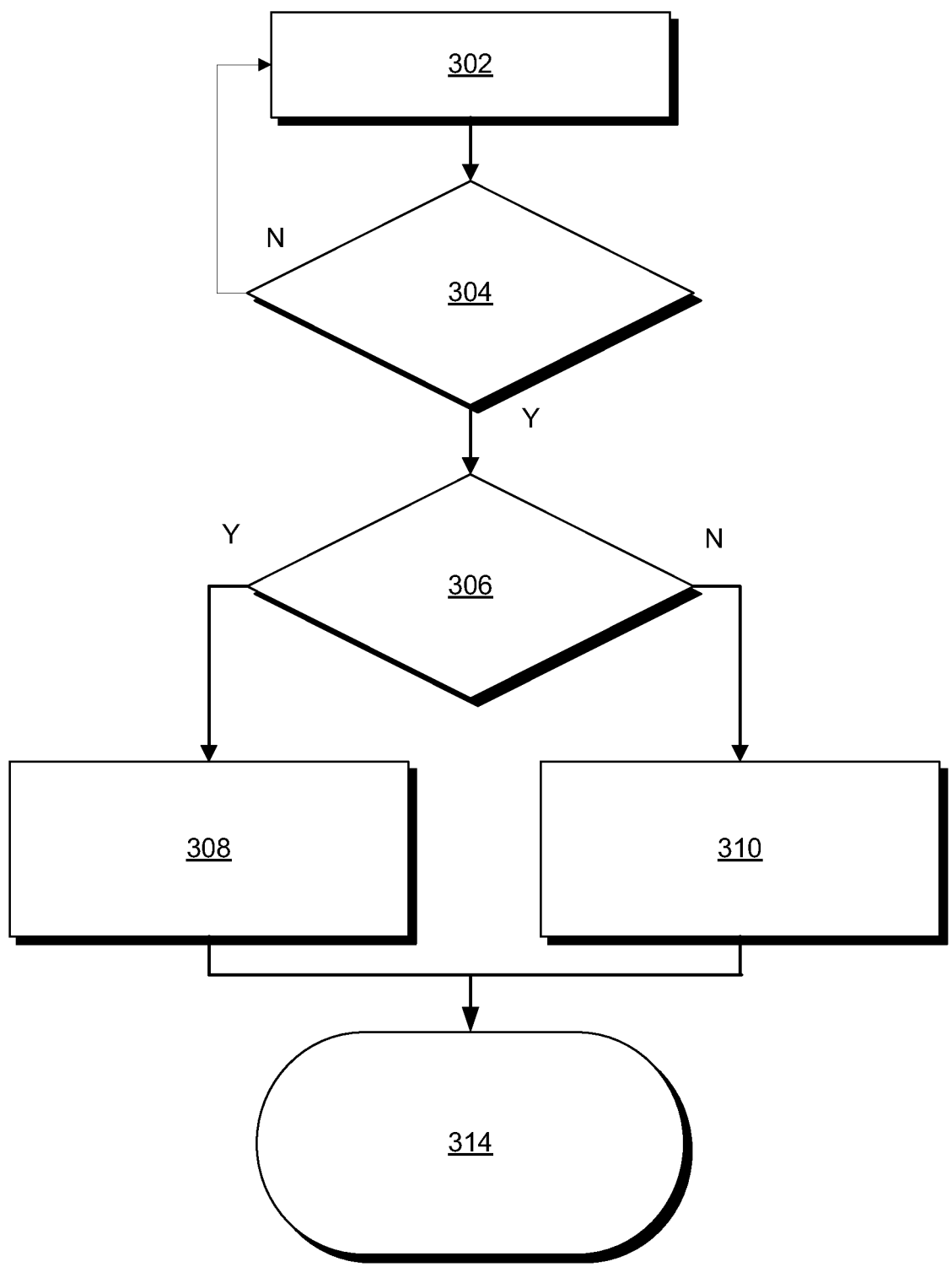
FIG. 3 is a block diagram depicting a method in accordance with one embodiment of the present invention.

Returning again to the flowchart shown in FIG. 3, processing continues with step 314, in which the computed coefficient of friction is provided to CPS adjustment controller 124, which then uses that value to modify the entrance criterion (described above) for engaging in collision avoidance maneuvers. If collision avoidance maneuvers are required (based on the entrance criteria), CPS adjustment controller 124 provides appropriate signals to brake controller 120 and steering controller 110 such that the vehicle decelerates and/or turns to avoid the object-of-interest in the path of the vehicle. This step may also include activating a forward collision alert—e.g., an auditory and/or visual alert to be sensed by the driver of the vehicle, warning him or her that an object exists within the path of the vehicle. The alert may be generated, for example, via any of the functional modules illustrated in FIG. 1.

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A vehicle control method comprising:

during a vehicle control event, determining whether a previous vehicle control event has occurred within a predetermined timeframe;

if a previous vehicle control event has occurred within the predetermined timeframe: retrieving a stored coefficient of friction value associated with the previous vehicle control event and setting the current coefficient of friction equal to the stored coefficient of friction value;

if a previous vehicle control event has not occurred within the predetermined timeframe:

iteratively modifying a level of braking of the vehicle until it is determined that a tire of the vehicle has substantially lost traction with respect to a surface that is in contact with the tire;

determining the current coefficient of friction between the surface and the tire based on the level of braking at the time the vehicle substantially lost traction with respect to the surface; and storing the current coefficient of friction.

2. The vehicle control method of claim 1, wherein iteratively modifying the level of braking includes increasing or decreasing the level of braking by a predetermined amount.

3. The vehicle control method of claim 1, wherein determining the coefficient of friction includes determining the acceleration of the vehicle at the time the vehicle lost traction with respect to the surface.

4. The vehicle control method of claim 1, wherein the predetermined timeframe is between 3 and 10 seconds.

5. The vehicle control method of claim 1, further including determining whether collision will occur between the vehicle and an object-of-interest within a predetermined timeframe.

6. The vehicle control method of claim 1, further including generating an alert message for a driver within the vehicle.

7. The vehicle control method of claim 1, further including modifying criteria for engaging in collision avoidance maneuvers based on the coefficient of friction.

* * * * *